June 12, 1934.  C. A. PIERSON  1,962,908
BROILING DEVICE
Filed July 29, 1932
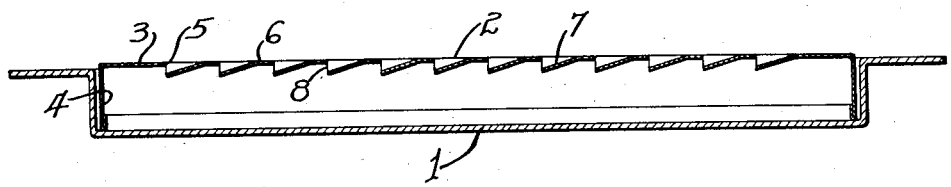
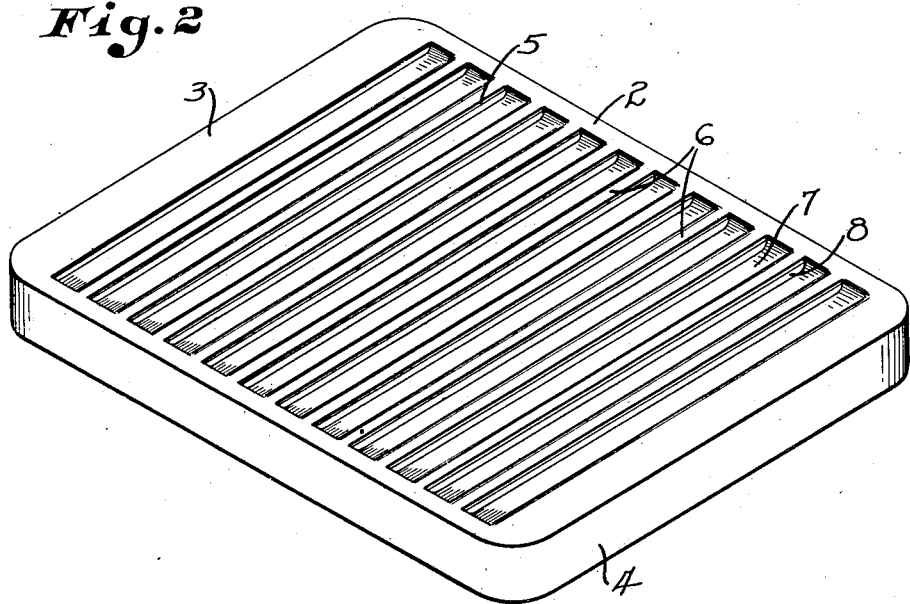
Inventor
Charles A. Pierson
By Owen & Owen
Attorneys.

Patented June 12, 1934

1,962,908

UNITED STATES PATENT OFFICE 1,962,908

BROILING DEVICE

Charles A. Pierson, Toledo, Ohio, assignor to The Standard Electric Stove Company, Toledo, Ohio, a corporation of Ohio Application July 29, 1932, Serial No. 625,732

1 Claim. (Cl. 53—5)

This invention relates to broiling devices of the type commonly used in connection with gas, electric, and other cook stoves, for broiling steaks and the like, and has primarily for its object the provision of a broiling rack of such form that it will quickly direct any grease drippings to the associated drip pan, and will at the same time prevent the heat rays radiating from the heating source from coming in direct contact at any point with the grease in the pan, thus preventing the heating of such grease to an extent necessary to cause the objectionable smoking or ignition thereof at any temperature generally used for broiling.

The invention is fully described in the following specification, and, while in its broader aspect it is capable of embodiment in various forms, one embodiment thereof is illustrated in the accompanying drawing, in which:

Figure 1 is a vertical cross-section of a broiling rack embodying the invention mounted in an associated drip pan; and Figure 2 is a perspective view of the rack removed from the pan.

Referring to the drawing, 1 designates the customary drip pan, which is usually adapted to be removably mounted in an oven, with its top suitably spaced below the heat emanating source customarily used for broiling, and 2 is the broiling rack mounted in the pan and constituting the invention.

The rack 2, in its present embodiment, comprises a substantially flat plate 3 provided at its edges with suitable supporting means, such for instance as a depending flange 4 adapted to project down into the pan and rest freely on its bottom to permit removal for cleaning. A plate 3 is provided crosswise thereof with a plurality of parallel equidistantly spaced slits 5 and the material of the plate, in the present instance, at the same side of each slit, is pressed inwardly at an incline from near the next adjoining slit, so as to provide the plate with a plurality of spaced strip-like supporting surfaces 6 for the meat to be broiled, and with a plurality of inclined flanges or louvers 7 alternating therewith. The free edges of the flanges 7 are vertically spaced from and cooperate with the free edges of the respective strips to form horizontally opening slots 8 through which the grease drippings, which flow down the inclined surfaces from the meat being broiled, may pass to the interior of the pan 1.

Three features are important in connection with the form of the construction of the rack, so far as carrying out the idea of the invention is concerned, namely, (1) to have the strip portion 6 of narrow width, or so fashioned that the grease drippings will not accumulate thereon; (2) to have the surfaces 7 so inclined or fashioned as to cause the grease drippings to quickly flow downward thereover and through the slots 8 and into the pan 1, thus preventing a sufficient period of exposure of the grease on said surfaces to the direct rays of the broiling heat to cause smoking or ignition thereof; and (3) to have the free edge of each surface 7 so terminate with respect to the free edge of the adjacent strip 6 as to both form a slot or opening 8 and to prevent direct rays of radiant heat from the heating source from passing through such slot or openings and causing smoking or ignition of the grease in the pan, unless such rays, as for instance slanting rays, are of such length as not to cause either smoking or ignition of the grease in the pan with which they contact.

It is found in practice that a broiling rack like illustrated, will effectively prevent both the smoking or ignition of the grease drippings, either on the rack or in the pan, by any heat suitable or desirable for broiling.

It is apparent that the strips 6 and inclined portions 7 in effect form louver members, which successively lap or substantially lap each other in spaced relation to form laterally disposed passages therebetween, and which have their outer or exposed edge portions forming spaced horizontally aligned supports for meat, or the like, placed thereon.

Having thus described my invention, what I claim is new and desire to secure by Letters Patent is:

In a broiler device for use with a drip-pan, a body having a flat top plate provided with depending marginal flanges the bottoms of which latter are formed to seat on the bottom of a drip-pan, said plate being formed with a series of spaced transversely extending strip-like supports having flat upper surfaces that form parts of said top plate and each having an inclined flange extending downwardly and forwardly from one edge of each support, the lower edges of the inclined flanges being spaced from and substantially alined in a vertical plane with the opposite edge of the next adjacent support, whereby to form horizontally extending passages, there being free space between the free edges of the inclined flanges and between the supports and the bottom of the pan, the outer sides of the strip-like supports being spaced from the adjacent ends of the top plate and the ends of the said supports being spaced from the adjacent sides of the top plate whereby the top plate has a flat margin which encompasses the supports and with the latter provide a flat top for the device.

CHARLES A. PIERSON.